US010641130B2

(12) United States Patent
Sasaki

(10) Patent No.: US 10,641,130 B2
(45) Date of Patent: May 5, 2020

(54) TURNING DEVICE

(71) Applicant: MITSUBISHI HEAVY INDUSTRIES COMPRESSOR CORPORATION, Tokyo (JP)

(72) Inventor: Yuichi Sasaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 114 days.

(21) Appl. No.: 16/060,363

(22) PCT Filed: Feb. 10, 2016

(86) PCT No.: PCT/JP2016/000704
§ 371 (c)(1),
(2) Date: Jun. 7, 2018

(87) PCT Pub. No.: WO2017/138040
PCT Pub. Date: Aug. 17, 2017

(65) Prior Publication Data
US 2018/0363511 A1 Dec. 20, 2018

(51) Int. Cl.
F01D 25/36 (2006.01)
F16H 27/02 (2006.01)
F16H 1/30 (2006.01)
F16H 35/18 (2006.01)
F01D 21/00 (2006.01)

(52) U.S. Cl.
CPC .............. F01D 25/36 (2013.01); F16H 1/30 (2013.01); F16H 27/02 (2013.01); F16H 35/18 (2013.01); F01D 21/00 (2013.01); F05D 2270/64 (2013.01)

(58) Field of Classification Search
CPC . F16H 1/30; F16H 27/02; F16H 35/18; F01D 25/36
See application file for complete search history.

(56) References Cited

U.S. PATENT DOCUMENTS 5,042,315 A * 8/1991 Fahy ........................ F16H 57/12
74/411
5,365,801 A * 11/1994 Nakamura ................ F16H 1/16
108/139
7,584,682 B2 * 9/2009 Hsiao ................... B60N 2/0296
74/10.27

(Continued)

FOREIGN PATENT DOCUMENTS

JP 5822486 B2 11/2015

Primary Examiner — David M Fenstermacher
(74) Attorney, Agent, or Firm — Osha Liang LLP

(57) ABSTRACT

A turning device includes: a driving source; a main drive gear rotationally driven by the driving source; a driven gear that engages with the main drive gear and is rotated integrally with a rotated body, wherein the turning device rotationally drives the driving source to rotate the rotated body; a movement mechanism that causes the main drive gear to reciprocate in an axial direction between a separated position at which engagement of the main drive gear and the driven gear is released and an engaged position at which the main drive gear engages with the driven gear; a forward rotation mechanism that intermittently rotates the main drive gear; and a reverse rotation mechanism that intermittently rotates the main drive gear in a direction opposite to a direction by the forward rotation mechanism.

11 Claims, 7 Drawing Sheets

(56) References Cited

U.S. PATENT DOCUMENTS

| | | | |
|---|---|---|---|
| 7,669,275 B2* | 3/2010 | Yagi | B60S 1/166 15/250.3 |
| 2004/0226395 A1* | 11/2004 | Diana | F16H 55/24 74/425 |
| 2015/0143936 A1* | 5/2015 | Eo | F16H 3/089 74/339 |
| 2016/0003327 A1* | 1/2016 | Kim | F16H 3/006 74/339 |

* cited by examiner

TURNING DEVICE

TECHNICAL FIELD

The present invention relates to a turning device that rotates a turbine rotor in a steam turbine, a gas turbine, or the like.

BACKGROUND ART

A turbine rotor is used as a rotated body in, for example, a steam turbine, a gas turbine, and a power generation plant applied to a combined cycle including a combination thereof. If the turbine rotor is left in a stopped state with high temperature after operation, the turbine rotor may be bent, in some cases, due to thermal distortion of the turbine rotor caused by temperature difference in a turbine casing along with temperature decrease of the steam or the gas inside a turbine, or due to own weight of the rotor.

Accordingly, to prevent the turbine rotor from being bent, it is necessary to perform turning in which the turbine rotor is rotated at a low speed for a predetermined time during the operation stop of the steam turbine, or the like. A turning device that rotates the turbine rotor by power of a motor is widely used to perform such turning.

The turning device has been subjected to various improvements for prevention of breakage and delay of deterioration with time. For example, Patent Literature 1 discloses a turning device including a reverse rotation preventing unit at a shaft end of a pinion shaft. The reverse rotation preventing unit prevents reverse rotation of the pinion shaft and a one-way clutch that transmits rotating force of the turning motor to the pinion shaft, in order to prevent the turning device from being reversely rotated and being damaged when the turbine rotor is reversely rotated.

CITATION LIST

Patent Literature

Patent Literature 1: JP 5822486 B2

Incidentally, the turning device transmits the rotating force of the turning motor through a pinion gear provided on the pinion shaft and a wheel gear rotated integrally with the turbine rotor, and causes the pinion gear and the wheel gear to automatically engage with each other. In the present circumstances, however, if engagement operation is stopped halfway due to some factors, the turning device does not include a mechanism automatically performing restoration as with the turning device disclosed in Patent Literature 1, and it is necessary to perform manual restoration.

SUMMARY

One or more embodiments of the present invention provide a turning device that is restored easily even if the engagement operation of the pinion shaft is stopped halfway due to some factors.

A turning device according to one or more embodiments of the present invention is provided with a driving source, a main drive gear configured to be rotationally driven by the driving source, and a driven gear configured to engage with the main drive gear and to be rotated integrally with a rotated body, and the turning device rotationally drives the driving source to rotate the rotated body. The turning device includes: a movement mechanism configured to cause the main drive gear to reciprocate in an axial direction between a separated position at which engagement of the main drive gear and the driven gear is released and an engaged position at which the main drive gear engages with the driven gear; a forward rotation mechanism configured to intermittently rotate the main drive gear; and a reverse rotation mechanism configured to intermittently rotate the main drive gear in a direction opposite to a direction by the forward rotation mechanism.

In one or more embodiments of the present invention, the forward rotation mechanism includes a forward rotating body that is fixed to a rotary shaft of the main drive gear, and a forward rotation actuator that forward rotates the forward rotating body, and the reverse rotation mechanism includes a reverse rotating body that is fixed to the rotary shaft of the main drive gear, and a reverse rotation actuator that reversely rotates the reverse rotating body.

The turning device according to one or more embodiments of the present invention further includes a first detection sensor configured to detect a phase of the main drive gear in a rotation direction, and the main drive gear is rotated forward by the forward rotation mechanism or is rotated reversely by the reverse rotation mechanism, based on a result of detection by the first detection sensor.

In the turning device according to one or more embodiments of the present invention, it is determined that engagement operation of the main drive gear and the driven gear is stopped in a case where the first detection sensor does not detect variation of the phase for a predetermined time.

In the turning device according to one or more embodiments of the present invention, when it is determined that the engagement operation of the main drive gear and the driven gear is stopped, the movement mechanism moves the main drive gear to the separated position, and the reverse rotation mechanism reversely rotates the main drive gear.

The turning device according to one or more embodiments of the present invention further includes a second detection sensor configured to detect that the main drive gear reversely rotated is located at the separated position, and the forward rotation mechanism forward rotates again the main drive gear located at the separated position when the second detection sensor detects that the main drive gear is located at the separated position.

According to one or more embodiments of the present invention, even if the engagement operation of the pinion gear and the wheel gear is stopped halfway due to some factors, the reverse rotation mechanism reversely rotates the pinion shaft, which makes it possible to cause the pinion gear and the wheel gear to engage with each other. Accordingly, a restoration work is easily performed as compared with manual operation.

DETAILED DESCRIPTION

Embodiments of a turning device according to the present invention are described below with reference to accompanying drawings.

Figure 1:
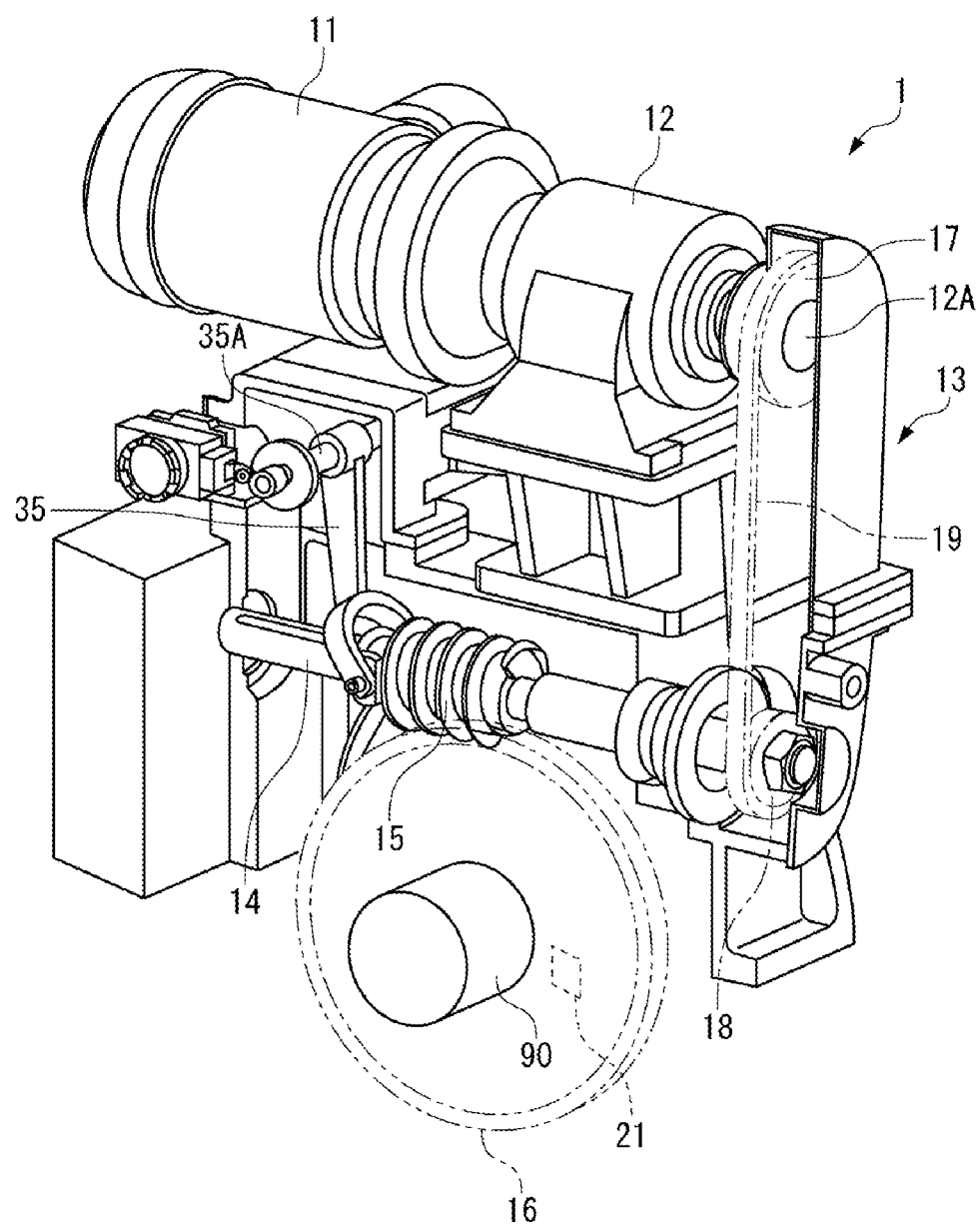
FIG. 1 is a perspective view illustrating a schematic configuration of a turning device according to one or more embodiments of the present invention.
Figure 2:
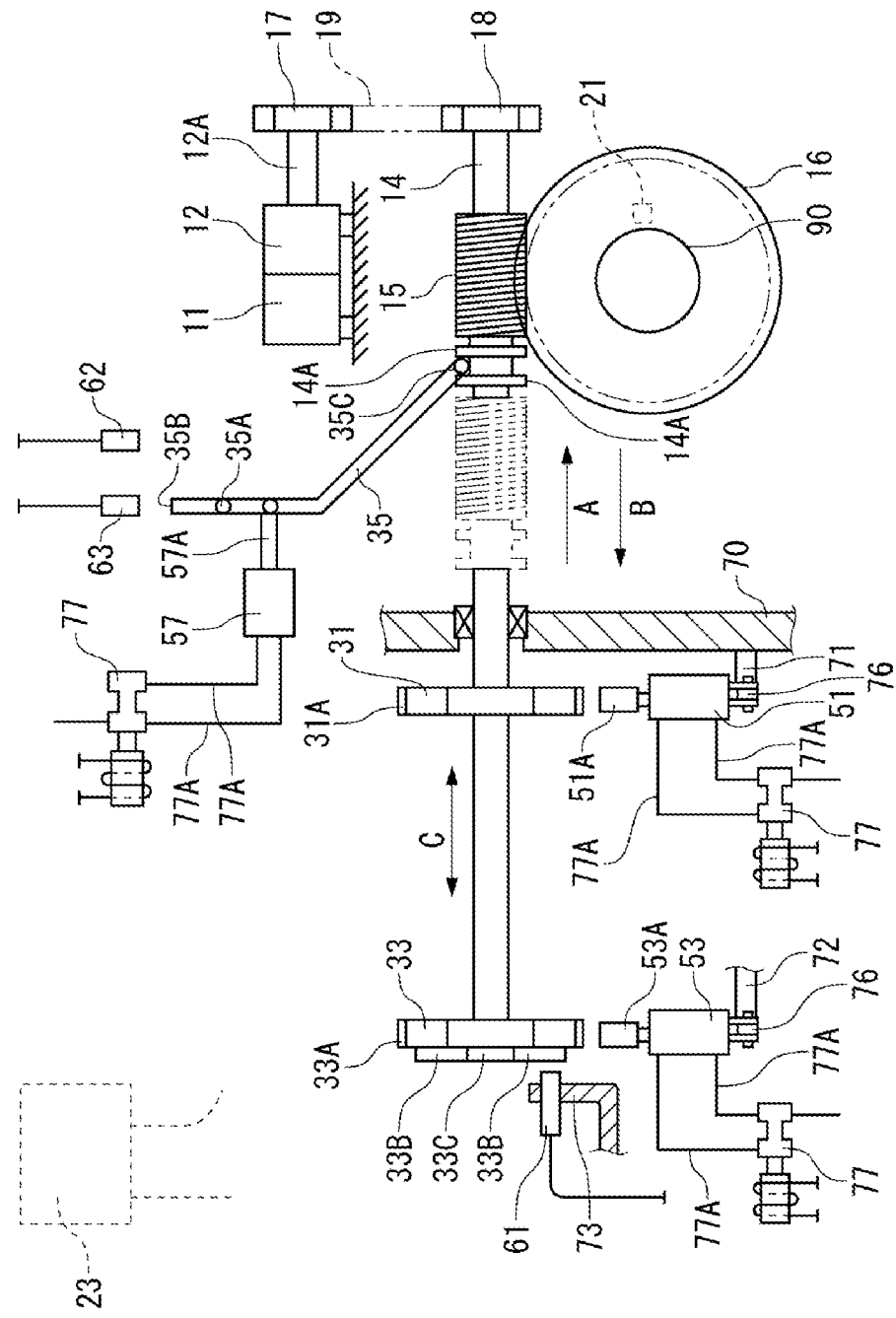
FIG. 2 is a side view illustrating a schematic configuration of the turning device according to one or more embodiments of the present invention by enlarging a part of FIG. 1.

As illustrated in FIG. 1 and FIG. 2, a turning device 1 according to one or more embodiments is used while being coupled to a turbine rotor 90 as a rotated body. For example, the turning device 1 rotates the turbine rotor 90 at a low speed of several rotation per minute for a predetermined time while operation of a steam turbine is stopped, to prevent the turbine rotor 90 from being slightly bent due to own weight of the turbine rotor 90.

To rotate the turbine rotor 90 at a low speed for a predetermined time, as illustrated in FIG. 1, the turning device 1 includes: a turning motor 11 serving as a driving source that rotates an output shaft (not illustrated) at a predetermined rotation frequency by power supplied from a power supply; a reduction gear 12 that is connected to the output shaft of the turning motor 11 and reduces the rotation frequency at a constant speed ratio (reduction ratio) to transmit the rotation frequency to an output shaft 12A; a power transmission unit 13 that includes, as a component, a turning motor-side sprocket 17 coupled to a shaft end of the output shaft 12A; a pinion gear 15 serving as a main drive gear attached to a pinion shaft 14 that configures the power transmission unit 13; and a wheel gear 16 serving as a driven gear that is configured to be engageable with the pinion gear 15 and is fixed to the turbine rotor 90.

The turning device 1 includes a tachometer 21 that detects the rotation speed of the turbine rotor 90. The rotation speed of the turbine rotor 90 detected by the tachometer 21 is continuously transmitted to a control section 23 provided in the turning device 1, through a signal line not illustrated.

The control section 23 controls operation of the turning device 1 and includes a computer device.

The control section 23 acquires a detection result in the tachometer 21, a first proximity switch 61, a second proximity switch 62, and a third proximity switch 63. The control section 23 controls operation of the turning motor 11, a forward rotation hydraulic cylinder 51, a reverse rotation hydraulic cylinder 53, and a fitting/releasing hydraulic cylinder 57, based on the acquired detection results.

The power transmission unit 13 includes the turning motor-side sprocket 17 that is fixed to the reduction gear 12 as a driving side and a pinion gear-side sprocket unit 18 as a driven side. A chain 19 is wound around the turning motor-side sprocket 17 and the pinion gear-side sprocket unit 18, and rotational driving force of the turning motor-side sprocket 17 is transmitted to the pinion gear-side sprocket unit 18 through the chain 19. The pinion gear-side sprocket unit 18 is fixed to a shaft end of the pinion shaft 14 as a rotary shaft.

The pinion gear 15 has a cylindrical shape and has a thread provided in a spiral shape on an outer peripheral surface. The pinion gear 15 is fixed to the pinion shaft 14 while the pinion shaft 14 penetrates through a center of the pinion gear 15. The pinion gear 15 is attached to the pinion shaft 14 so as to be rotated integrally with the pinion shaft 14, and to be relatively reciprocatable in an axis direction C (lateral direction in FIG. 2) relative to the pinion shaft 14 as illustrated in FIG. 2.

The wheel gear 16 has an annular shape, and includes a tooth profile engageable with the pinion gear 15 on an outer peripheral surface, thereby serving as a gear. The wheel gear 16 is fixed to the turbine rotor 90 to transmit the rotational driving force outputted from the turning device 1, to the turbine rotor 90.

The turning device 1 causes the pinion gear 15 and the wheel gear 16 to engage with each other, or releases engagement of the pinion gear 15 and the wheel gear 16 to be separated from each other. To do that, the turning device 1 includes a forward rotation mechanism and a reverse rotation mechanism. More specifically, as illustrated in FIG. 2, the turning device 1 includes, as a component of the forward rotation mechanism, a forward rotating body 31 that intermittently rotates the pinion shaft 14 in a clockwise direction. In addition, the turning device 1 includes, as a component of the reverse rotation mechanism, a reverse rotating body 33 that intermittently rotates the pinion shaft 14 in a counter-clockwise direction. Further, the turning device 1 includes a fitting/releasing lever 35 that is connected to one end of the pinion gear 15, as a component of a movement mechanism that causes the main drive gear to reciprocate between a separated position and an engaged position in an axial direction C.

The forward rotating body 31 and the reverse rotating body 33 are members that are coaxially fixed to the pinion shaft 14 with a distance therebetween. Note that, in one or more embodiments, clockwise rotation corresponds to the forward rotation and counterclockwise rotation corresponds to the reverse rotation as an example.

Figure 3:
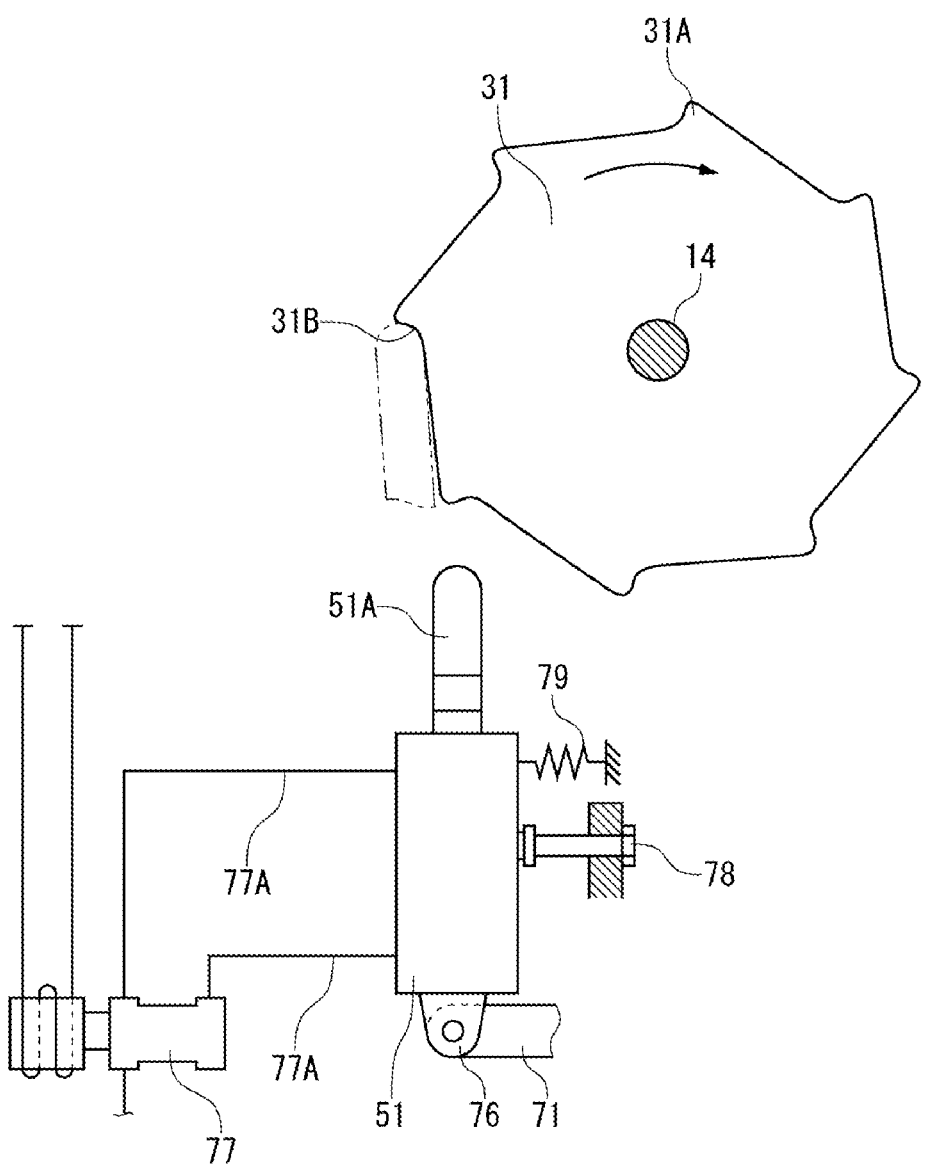
FIG. 3 is a cross-sectional view illustrating a forward rotation mechanism of one or more embodiments.

As illustrated in FIG. 3, the forward rotating body 31 has a disc shape, and includes a plurality of protrusions 31A that are provided with equal intervals on an outer peripheral surface. A side surface 31B of each of the protrusions 31A is formed so as to engage with a front end of a push rod 51A that is a piston rod of the forward rotation hydraulic cylinder 51 described later. The forward rotating body 31 is fixed to the pinion shaft 14 while the pinion shaft 14 penetrates through an inner cavity of the forward rotating body 31. This makes it possible to transmit rotation of the forward rotating body 31 to the pinion shaft 14.

The forward rotation hydraulic cylinder 51 as a forward rotation actuator that rotates the forward rotating body 31 forward, is provided around the forward rotating body 31. The forward rotation hydraulic cylinder 51 is swingably supported, by a pin 76, to a front end of a first mount 71 that is fixed to an inner surface of a gearbox 70. The forward rotation hydraulic cylinder 51 is disposed at a predetermined position by being pulled by a tension spring 79 so as to come into contact with a front end of a stopper 78.

Further, paired pipes 77A and 77A are connected to the forward rotation hydraulic cylinder 51. Working fluid is supplied to or discharged from the forward rotation hydraulic cylinder 51 through the pipes 77A and 77A from a switching valve 77 that is operated in response to an electric signal or other signal provided from the first proximity switch 61 as a first detection sensor. As a result, the push rod 51A is advanced and retreated. When the push rod 51A is advanced, the front end of the push rod 51A engages with any of the plurality of protrusions 31A provided on the outer peripheral surface of the forward rotating body 31, and the forward rotating body 31 is accordingly rotated forward.

Figure 4:
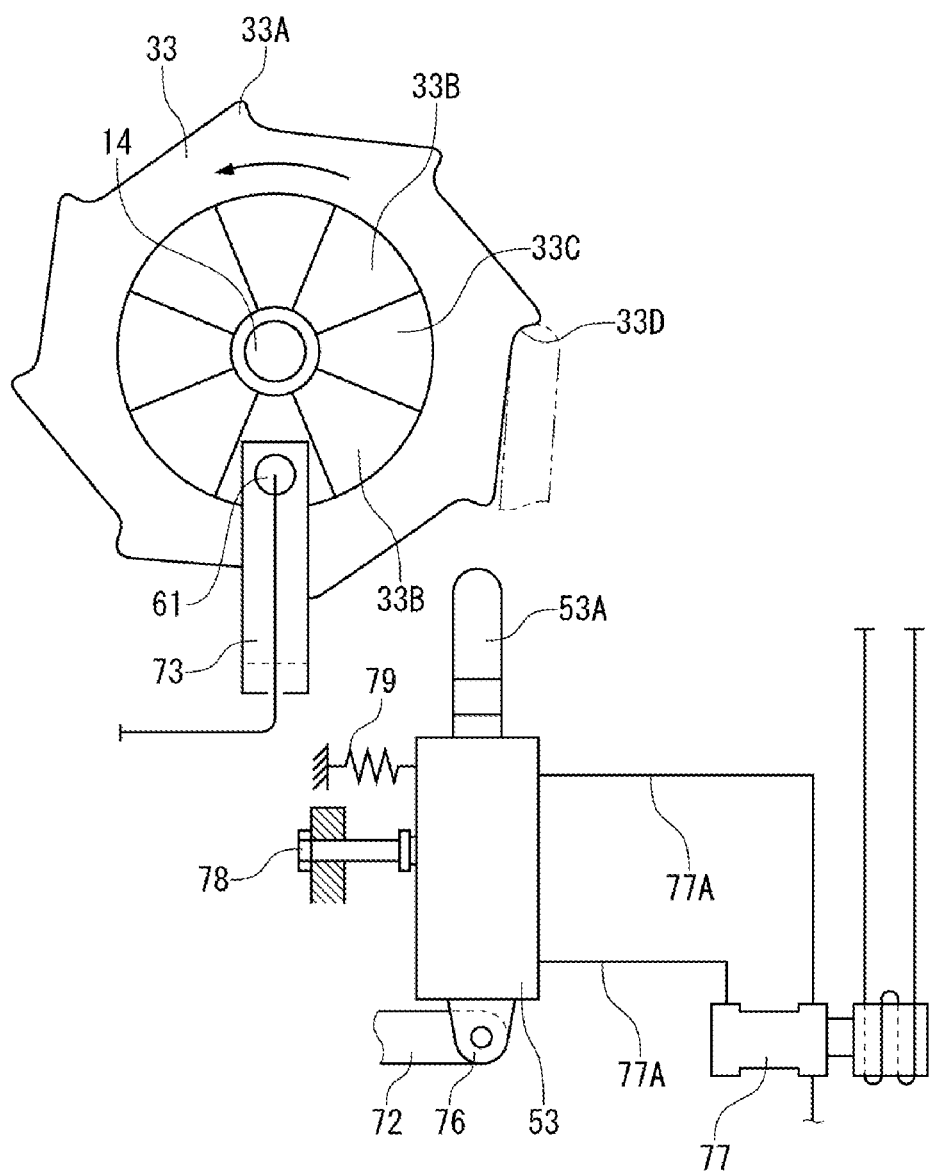
FIG. 4 is a cross-sectional view illustrating a reverse rotation mechanism of one or more embodiments.

As illustrated in FIG. 4, the reverse rotating body 33 has a disc shape, and includes a plurality of protrusions 33A that are provided with equal intervals on an outer peripheral surface. A side surface 33D of each of the protrusions 33A is provided in a state where each of the protrusions 31A of the forward rotating body 31 is inverted laterally, and is formed so as to engage with a front end of a push rod 53A of the reverse rotation hydraulic cylinder 53 described later. Further, the reverse rotating body 33 includes a plurality of convex parts 33B and a plurality of concave parts 33C with different thicknesses on a surface of the reverse rotating body 33 on a side facing the first proximity switch 61 described later, in order to specify a rotating position. The convex parts 33B and the concave parts 33C each have a fan-shaped flat surface, and are alternately arranged and coupled to form an annular shape. Specification of the rotating position makes it possible to detect a phase, in the rotating direction, of the pinion shaft 14 that is fixed to the reverse rotating body 33 and is rotated at the same time.

The reverse rotating body 33 is fixed to the pinion shaft 14 while the pinion shaft 14 penetrates through a center of the reverse rotating body 33. In one or more embodiments, as illustrated in FIG. 2, the reverse rotating body 33 is fixed to the pinion shaft 14 with an interval from the forward rotating body 31 in the axial direction C of the pinion shaft 14. The reverse rotating body 33 also transmits the rotation to the pinion shaft 14, as with the forward rotating body 31.

As illustrated in FIG. 4, the first proximity switch 61 is provided on side close to one of surfaces of the reverse rotating body 33 so as to face the convex parts 33B and the concave parts 33C. When the reverse rotating body 33 is rotated, the first proximity switch 61 distinguishes and detects a period in which the first proximity switch 61 faces any of the convex parts 33B and a period in which the first proximity switch 61 faces any of the concave parts 33C. The first proximity switch 61 is fixed to a third mount 73 fixed to an inner surface inside the gearbox 70.

Further, the reverse rotation hydraulic cylinder 53 as a reverse rotation actuator that rotates the reverse rotating body 33 reversely, is provided on outside of the reverse rotating body 33 in a radial direction, in a manner similar to the forward rotation hydraulic cylinder 51. In other words, the reverse rotation hydraulic cylinder 53 is swingably supported, by the pin 76, to a front end of a second mount 72 that is fixed to the inner surface (not illustrated) of the gearbox 70. The reverse rotation hydraulic cylinder 53 is disposed at a predetermined position by being pulled by the tension spring 79 so as to come into contact with the front end of the stopper 78.

Further, the paired pipes 77A and 77A are connected to the reverse rotation hydraulic cylinder 53. Working fluid is supplied to or discharged from the reverse rotation hydraulic cylinder 53 through the pipes 77A and 77A from the switching valve 77 that is operated in response to an electric signal or other signal provided from the first proximity switch 61. As a result, the reverse rotation hydraulic cylinder 53 advances and retreats the push rod 53A. When the push rod 53A is advanced, the front end of the push rod 53A engages with any of the plurality of protrusions 33A provided on the outer peripheral surface of the reverse rotating body 33, and the reverse rotating body 33 is accordingly rotated reversely.

Next, as illustrated in FIG. 2, the fitting/releasing lever 35 has an L-shape, and a vicinity of an upper end 35B is rotatably supported by a rotary shaft 35A and swings around the rotary shaft 35A. Further, a lower end 35C of the fitting/releasing lever 35 is locked between paired annular walls 14A and 14A that are fixed to the pinion shaft 14. The lower end 35C is locked so as to allow rotation of the pinion gear 15 but to retrain movement of the pinion gear 15 in the axial direction C in a state of being housed between the annular walls 14A and 14A. As a result, the pinion gear 15 is allowed in rotation in a circumferential direction and linearly moved from the separated position (virtual line on left side in FIG. 2) to the engaged position (solid line on right side in FIG. 2), or from the engaged position to the separated position, along with the swing of the fitting/releasing lever 35.

As illustrated in FIG. 2, the second proximity switch 62 serving as a second detection sensor and the third proximity switch 63 serving as a third detection sensor are provided side by side in a horizontal direction with a predetermined interval therebetween, near the upper end 35B of the fitting/releasing lever 35. The second proximity switch 62 and the third proximity switch 63 are provided at positions that are separated by a predetermined distance from the upper end 35B of the fitting/releasing lever 35 in a vertical direction. The second proximity switch 62 is relatively disposed on right side of the third proximity switch 63. When the pinion gear 15 is moved in an engaging direction A along with the swing movement of the fitting/releasing lever 35, the upper end 35B moves in a separating direction B opposite to the engaging direction A. Accordingly, when the pinion gear 15 is located at the separated position, the upper end 35B faces the second proximity switch 62, and the second proximity switch 62 detects that the fitting/releasing lever 35 is located at the separated position. In addition, when the pinion gear 15 is located at the engaged position, the upper end 35B faces the third proximity switch 63, and the third proximity switch 63 detects that the fitting/releasing lever 35 is located at the engaged position. The second proximity switch 62 detects that the pinion gear 15 is located at the separated position, and the third proximity switch 63 detects that the pinion gear 15 is located at the separated position, in the above-described manner.

The fitting/releasing lever 35 is caused to swing by the fitting/releasing hydraulic cylinder 57 as a fitting/releasing actuator. Front end side of the piston rod 57A is rotatably coupled to the fitting/releasing lever 35, and the fitting/releasing hydraulic cylinder 57 advances and retreats the piston rod 57A to cause the fitting/releasing lever 35 to swing.

The paired pipes 77A and 77A are connected to the fitting/releasing hydraulic cylinder 57. Working fluid is supplied to or discharged from the fitting/releasing hydraulic cylinder 57 through the pipes 77A and 77A from the switching valve 77 that is operated in response to an electric signal or other signal provided from the second proximity switch 62 and the third proximity switch 63. As a result, the piston rod 57A is advanced or retreated. When the piston rod 57A is advanced, the pinion gear 15 is moved to the engaged position. When the piston rod 57A is retreated, the pinion gear 15 is moved to the separated position.

Next, operation of the turning device 1 is described with reference to FIG. 5 and FIG. 6. In the description of the operation, a normal state where the engagement operation of the pinion gear 15 and the wheel gear 16 is smoothly completed is first described with reference to FIG. 5, and then, an abnormal state where the engagement operation of the pinion gear 15 and the wheel gear 16 is stopped halfway is described with reference to FIG. 6.

Figure 5:
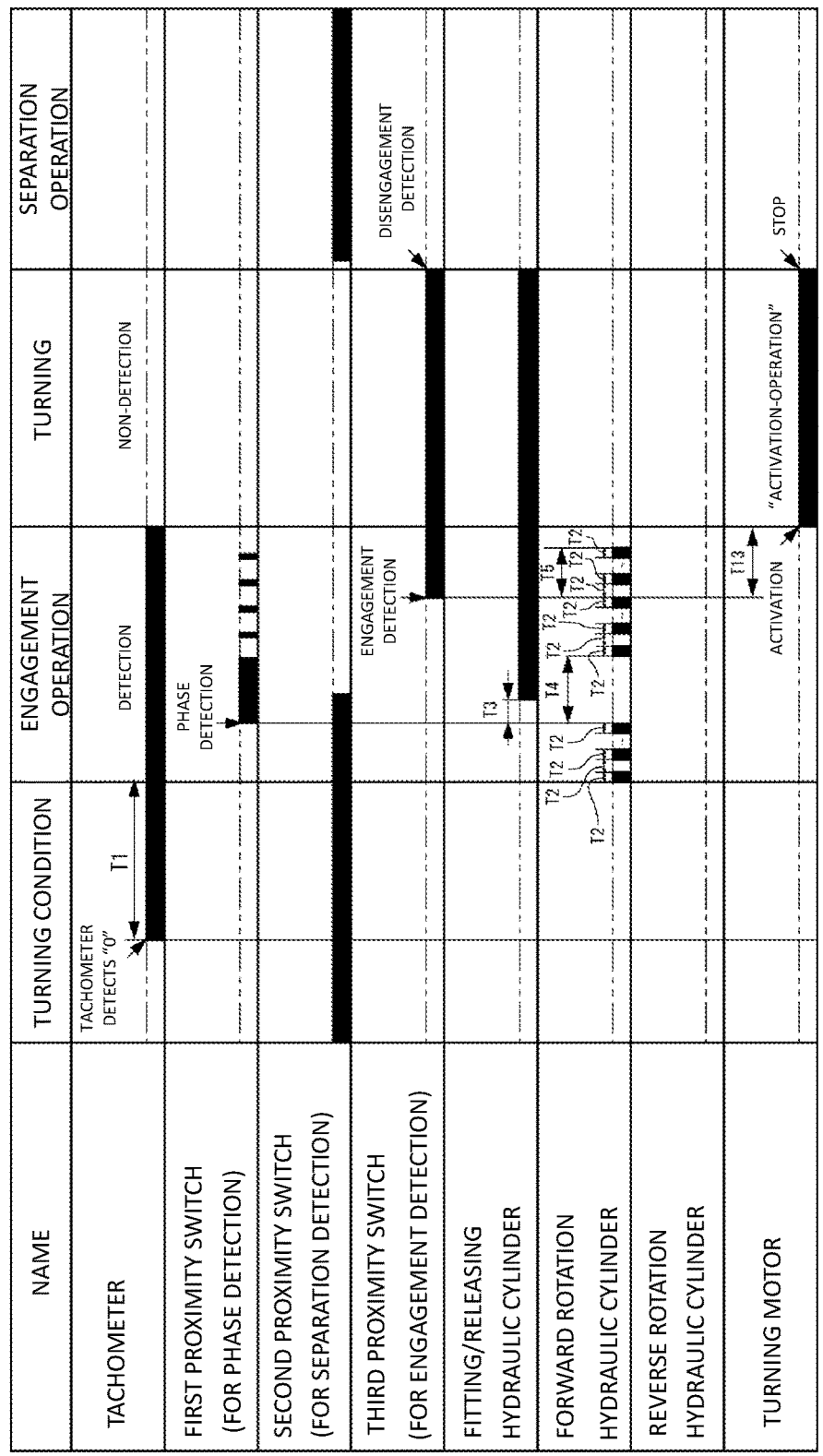
FIG. 5 is a diagram illustrating operation, in a normal state, of the turning device according to one or more embodiments of the present invention.
Figure 6:
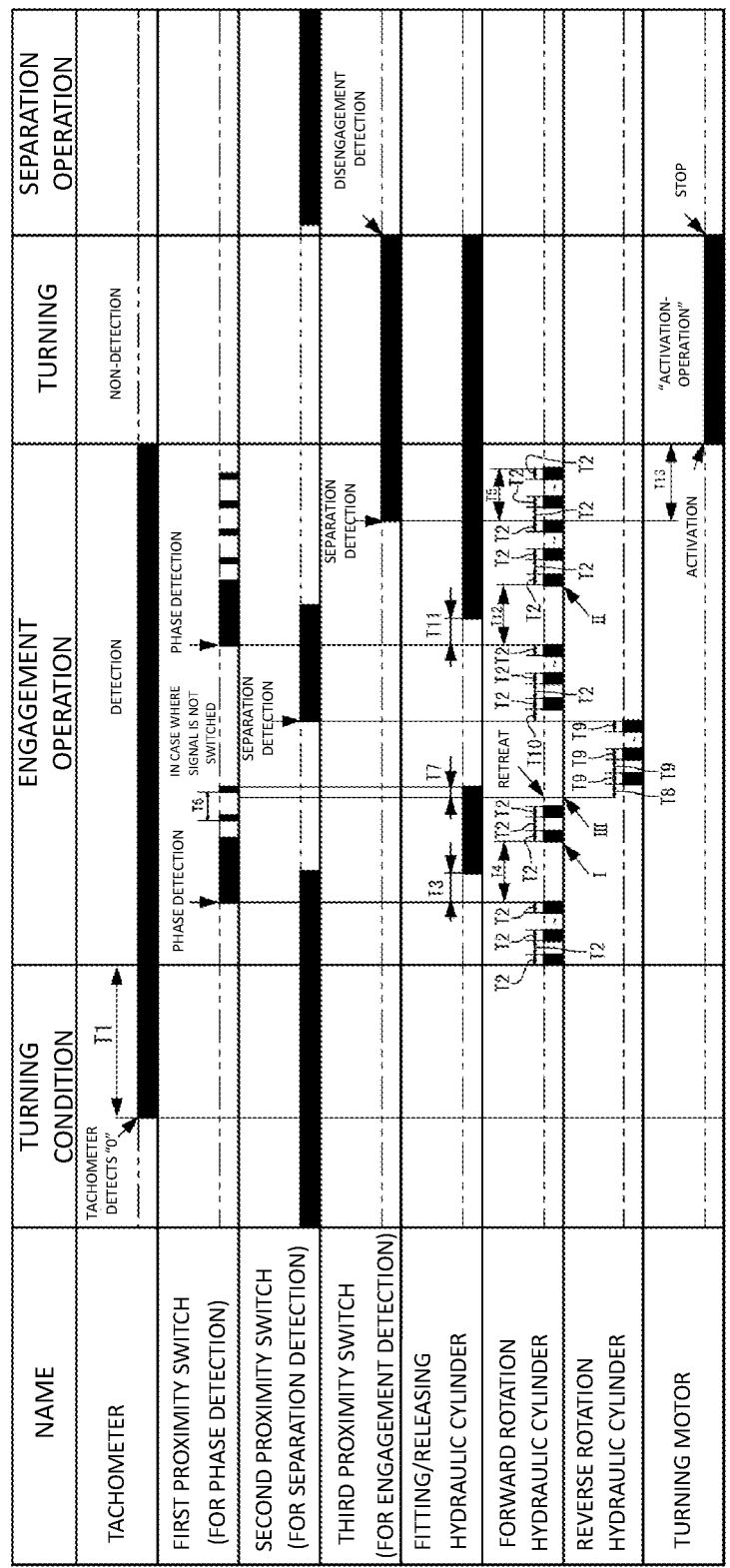
FIG. 6 is a diagram illustrating operation, in an abnormal state, of the turning device according to one or more embodiments of the present invention.

Note that, in FIG. 5 and FIG. 6, as for the tachometer 21, black painting indicates stop of the rotation of the turbine rotor 90. Further, as for the first proximity switch 61, the second proximity switch 62, and the third proximity switch 63, black painting indicates detection of a target member. Moreover, as for the forward rotation hydraulic cylinder 51, the reverse rotation hydraulic cylinder 53, and the fitting/releasing hydraulic cylinder 57, black painting indicates that the working fluid is supplied in a direction in which the respective piston rods are advanced. Further, as for the turning motor 11, black painting indicates that the turning motor 11 is rotationally driven. Furthermore, a display dimension indicates a time.

[Operation in Normal State]

When the tachometer 21 detects that the rotation of the turbine rotor 90 has been stopped (at speed of zero), and detects that the turbine has been completely stopped, forward rotation operation is performed after a time T1 elapses from the detection as illustrated in FIG. 5. More specifically, operation in which the push rod 51A is advanced from the forward rotation hydraulic cylinder 51 for a time T2, and then, the push rod 51A is retreated to the forward rotation hydraulic cylinder 51 for the time T2 is performed. The pinion shaft 14 and the pinion gear 15 are slightly rotated forward by one forward rotation operation. The pinion shaft 14 and the pinion gear 15 are gradually rotated forward through repetition of the forward rotation operation, and the first proximity switch 61 detects the phase. This causes the pinion gear 15 to be located at a specific position in the circumferential direction.

After a time T3 elapses from the phase detection by the first proximity switch 61, the piston rod 57A is advanced from the fitting/releasing hydraulic cylinder 57. The pinion gear 15 that is located at the separated position illustrated by a dashed line in FIG. 2 is moved in the engaging direction A through swing of the fitting/releasing lever 35 along with the movement of the piston rod 57A, and the pinion gear 15 is brought into contact with the wheel gear 16.

The pinion gear 15 is continuously moved in the engaging direction A even after the pinion gear 15 and the wheel gear 16 are brought into contact with each other. In addition, after a time T4 elapses from the phase detection, the forward rotation operation of the pinion gear 15 by the forward rotation hydraulic cylinder 51 is resumed. Accordingly, an engaging degree of the pinion gear 15 and the wheel gear 16 is gradually increased. In this process, when the fitting/releasing lever 35 reaches from the position detected by the second proximity switch 62 to the position detected by the third proximity switch 63, the engagement of the pinion gear 15 and the wheel gear 16 is detected. Thereafter, the forward rotation operation by the forward rotation hydraulic cylinder 51 is continuously performed until a time T5 elapses after the engagement is detected by the third proximity switch 63, and the engagement operation of the pinion gear 15 and the wheel gear 16 is then completed. At this time, the time T5 is set for completion of the engagement operation on the assumption that all of the tooth of the pinion gear 15 are respectively engaged with the tooth of the wheel gear 16.

The movement of the pinion gear 15 in the direction A is stopped at a time when the pinion gear 15 and the wheel gear 16 completely engage with each other, and the pinion shaft 14 is rotated by the turning motor 11 to start turning after a time T13 elapses from the engagement detection.

[Operation in Abnormal State]

Next, operation in the abnormal state where the engagement of the pinion gear 15 and the wheel gear 16 is incomplete due to some factors, is described with reference to FIG. 6.

When the tachometer 21 detects that the rotation of the turbine rotor 90 has been stopped (at speed of zero) and detects that the turbine has been completely stopped, the pinion gear 15 and the wheel gear 16 are brought into contact with each other, and the forward rotation operation by the forward rotation hydraulic cylinder 51 is resumed at a time point I. These operation are similar to those in the normal state.

In a case where the first proximity switch 61 is not switched for a time T6 after the forward rotation operation by the forward rotation hydraulic cylinder 51 is resumed, one of the convex part 33B or the concave part 33C is continuously detected, and it is determined that the engagement operation is stopped halfway due to some factors.

Therefore, the push rod 51A of the forward rotation hydraulic cylinder 51 is retreated, and the reverse rotation operation is performed after a time T8 elapses. More specifically, operation in which the push rod 53A of the reverse rotation hydraulic cylinder 53 is advanced for a time T9, and then, the push rod 53A of the reverse rotation hydraulic cylinder 53 is retreated for the time T9, is performed. The pinion shaft 14 and the pinion gear 15 are slightly rotated reversely by one reverse rotation operation. The pinion shaft 14 and the pinion gear 15 are gradually rotated reversely through repetition of the reverse rotation operation.

Further, retreat of the piston rod 57A of the fitting/releasing hydraulic cylinder 57 is started before a time T7 elapses after the push rod 51A of the forward rotation hydraulic cylinder 51 is retreated. When the fitting/releasing lever 35 accordingly reaches the position detected by the second proximity switch 62, the separation of the pinion gear 15 and the wheel gear 16 is detected.

Then, after a time T10 elapses from the separation detection, the forward rotation operation is performed again, and the phase is detected by the first proximity switch 61. After a time T11 elapses from the phase detection, the piston rod 57A is advanced from the fitting/releasing hydraulic cylinder 57, the pinion gear 15 is moved in the engaging direction A, and the pinion gear 15 and the wheel gear 16 are brought into contact with each other. The forward rotation operation by the forward rotation hydraulic cylinder 51 is resumed after a time T12 elapses from the phase detection, and the forward rotation operation by the forward rotation hydraulic cylinder 51 is performed until the time T5 elapses. When the forward rotation operation is performed until the time T5 elapses, the engagement operation is completed.

In a case where the first proximity switch 61 is not switched for the time T6 in the forward rotation operation that is performed from a time point II after the time T12 elapses, operation at a time point III is performed again, and the operation is repeated until the engagement is completed.

After the engagement operation is completed, the movement of the pinion gear 15 in the direction A is stopped as with the normal state. After the time T13 elapses from the engagement detection, the pinion shaft 14 is rotated by the turning motor 11 to start turning.

As described above, even if the engagement operation is stopped halfway, the turning device 1 makes it possible to automatically restore the engagement operation. This makes it possible to save the labor of an operator of the turning device 1, and to improve convenience.

In addition, the pinion gear 15 and the wheel gear 16 are gradually rotated at the low speed until the engagement thereof is completed. Therefore, even if the pinion gear 15 and the wheel gear 16 do not engage with each other halfway, both of the pinion gear 15 and the wheel gear 16 are not damaged. Accordingly, the pinion gear 15 and the wheel gear 16 are hardly deteriorated with time.

Figure 7A:
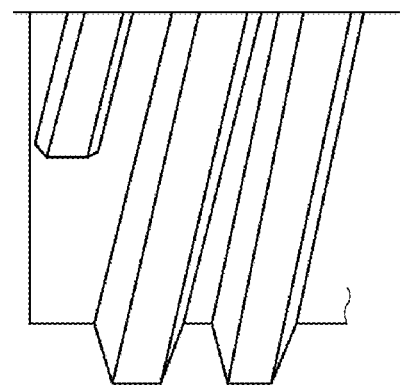
FIG. 7A illustrates a pinion gear of one or more embodiments.
Figure 7B:
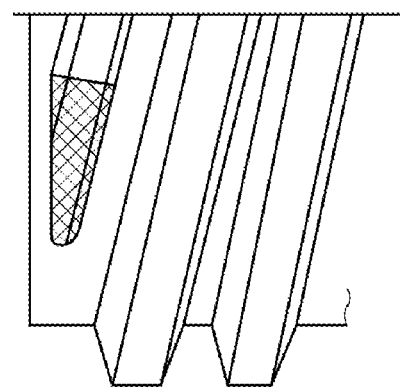
FIG. 7B illustrates an existing pinion gear.

As illustrated in FIG. 7A, the pinion gear 15 has the fixed thickness up to an end of the thread. In a case where the end of the thread is made thin as with a conventional example illustrated in FIG. 7B, a thin part is brought into contact with the wheel gear 16, and the front end of the thread of the pinion gear 15 is brought into contact with a side surface of the tooth profile of the wheel gear and does not engage with the wheel gear because the thin part has a pitch different from other parts, in some cases. In contrast, in one or more embodiments of the present invention, the thin part is not provided, which makes it possible to facilitate the engagement of the pinion gear 15 and the wheel gear 16. Further, it is possible to cause the pinion gear 15 and the wheel gear 16 to be hardly deteriorated with time.

Hereinbefore, the present invention has been described with reference to various embodiments; however, the configurations described in the above-described embodiments may be selected or appropriately modified without departing from the scope of the present invention.

In one or more embodiments, the convex parts 33B and the concave parts 33C are provided on the forward rotating body 31. Alternatively, the convex parts 33B and the concave parts 33C may be provided not on the forward rotating body 31 but on the reverse rotating body 33, and the phase may be detected by the detection sensor. This makes it possible to downsize the turning device 1.

In one or more embodiments, the forward rotating body 31 and the reverse rotating body 33 may not face each other. The convex parts and the concave parts may be provided also on the forward rotating body 31 and the phase may be detected by other proximity switch.

The forward rotating body 31 may have a shape other than the disc shape according to the shape of the gearbox 70 and the position of the first proximity switch 61 in the gearbox 70 as long as the forward rotating body 31 can rotate the rotary shaft forward. Likewise, the reverse rotating body 33 may have a shape other than the disc shape as long as the reverse rotating body 33 can rotate the rotary shaft reversely. The shape of the forward rotating body 31 and the shape of the reverse rotating body 33 may be different from each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Turning device
11 Turning motor
14 Pinion shaft
15 Pinion gear
16 Wheel gear
31 Forward rotating body
33 Reverse rotating body
35 Fitting/releasing lever
51 Forward rotation hydraulic cylinder
53 Reverse rotation hydraulic cylinder
57 Fitting/releasing hydraulic cylinder
61 First proximity switch
62 Second proximity switch
63 Third proximity switch A Engaging direction
B Separating direction
C Axial direction

The invention claimed is:

1. A turning device comprising:
a driving source;
a main drive gear rotationally driven by the driving source;
a driven gear that engages with the main drive gear and is rotated integrally with a rotated body, wherein the turning device rotationally drives the driving source to rotate the rotated body;
a movement mechanism that causes the main drive gear to reciprocate in an axial direction between a separated position at which engagement of the main drive gear and the driven gear is released and an engaged position at which the main drive gear engages with the driven gear;
a forward rotation mechanism that intermittently rotates the main drive gear; and
a reverse rotation mechanism that intermittently rotates the main drive gear in a direction opposite to a direction by the forward rotation mechanism.

2. The turning device according to claim 1, wherein the forward rotation mechanism includes:
a forward rotating body fixed to a rotary shaft of the main drive gear; and
a forward rotation actuator that forward rotates the forward rotating body, and
the reverse rotation mechanism includes:
a reverse rotating body that is fixed to the rotary shaft of the main drive gear; and
a reverse rotation actuator that reversely rotates the reverse rotating body.

3. The turning device according to claim 2, further comprising a first detection sensor that detects a phase of the main drive gear in a rotation direction, wherein
the main drive gear is rotated forward by the forward rotation mechanism or is rotated reversely by the reverse rotation mechanism, based on a result of detection by the first detection sensor.

4. The turning device according to claim 3, wherein engagement operation of the main drive gear and the driven gear is stopped when the first detection sensor does not detect variation of the phase for a predetermined time.

5. The turning device according to claim 4, wherein when the engagement operation of the main drive gear and the driven gear is stopped, the movement mechanism moves the main drive gear to the separated position, and the reverse rotation mechanism reversely rotates the main drive gear.

6. The turning device according to claim 5, further comprising a second detection sensor that detects that the main drive gear reversely rotated is located at the separated position, wherein
the forward rotation mechanism forward rotates again the main drive gear located at the separated position when the second detection sensor detects that the main drive gear is located at the separated position.

7. The turning device according to claim 1, wherein the rotated body includes a turbine rotor.

8. A turning device comprising:
a driving source;
a main drive gear rotationally driven by the driving source;

a driven gear that engages with the main drive gear and is rotated integrally with a rotated body, wherein the turning device rotationally drives the driving source to rotate the rotated body;

a movement mechanism that causes the main drive gear to reciprocate in an axial direction between a separated position at which engagement of the main drive gear and the driven gear is released and an engaged position at which the main drive gear engages with the driven gear;

a forward rotation mechanism that intermittently rotates the main drive gear; and a reverse rotation mechanism that intermittently rotates the main drive gear in a direction opposite to a direction by the forward rotation mechanism, wherein the forward rotation mechanism includes:
- a forward rotating body fixed to a rotary shaft of the main drive gear; and
- a forward rotation actuator that forward rotates the forward rotating body, the reverse rotation mechanism includes:
- a reverse rotating body that is fixed to the rotary shaft of the main drive gear, and
- a reverse rotation actuator that reversely rotates the reverse rotating body, and the turning device further comprises a first detection sensor that detects a phase of the main drive gear in a rotation direction, wherein the main drive gear is rotated forward by the forward rotation mechanism or is rotated reversely by the reverse rotation mechanism, based on a result of detection by the first detection sensor.

9. The turning device according to claim 8, wherein engagement operation of the main drive gear and the driven gear is stopped when the first detection sensor does not detect variation of the phase for a predetermined time.

10. The turning device according to claim 9, wherein
when the engagement operation of the main drive gear and the driven gear is stopped, the movement mechanism moves the main drive gear to the separated position, and the reverse rotation mechanism reversely rotates the main drive gear.

11. The turning device according to claim 10, further comprising: a second detection sensor that detects that the main drive gear reversely rotated is located at the separated position, wherein
the forward rotation mechanism forward rotates again the main drive gear located at the separated position when the second detection sensor detects that the main drive gear is located at the separated position.

* * * * *